US011281558B2

(12) United States Patent
Moyal et al.

(10) Patent No.: US 11,281,558 B2
(45) Date of Patent: Mar. 22, 2022

(54) COGNITIVE AND DEEP LEARNING-BASED SOFTWARE COMPONENT DISTRIBUTION

(71) Applicant: INTERNATIONAL BUSINESS MACHINES CORPORATION, Armonk, NY (US)

(72) Inventors: Shailendra Moyal, Pune (IN); Venkata Vara Prasad Karri, Visakhapatnam (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 177 days.

(21) Appl. No.: 16/734,835

(22) Filed: Jan. 6, 2020

(65) Prior Publication Data

US 2021/0208993 A1 Jul. 8, 2021

(51) Int. Cl.
*G06F 11/34* (2006.01)
*G06F 40/20* (2020.01)
(Continued)

(52) U.S. Cl.
CPC ...... *G06F 11/3438* (2013.01); *G06F 11/3086* (2013.01); *G06F 21/10* (2013.01);
(Continued)

(58) Field of Classification Search
CPC ...... G06F 11/3438; G06F 21/10; G06F 40/20; G06F 11/3086; H04N 21/2541;
(Continued)

(56) References Cited

U.S. PATENT DOCUMENTS 8,135,775 B1 * 3/2012 Anderson ............ G06F 8/61
709/203
10,503,879 B1 * 12/2019 Nerius ............... H04L 63/10
(Continued)

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
(Continued)

*Primary Examiner* — Ramy M Osman
(74) *Attorney, Agent, or Firm* — Konrad Raynes Davda & Victor LLP; Janaki K. Davda

(57) ABSTRACT

Provided are techniques for cognitive and deep learning-based component distribution. In response to receiving cognitive data from a plurality of workstations, the cognitive data is stored as global cognitive data. A plurality of cognitive usage keys are generated using the global cognitive data, where each cognitive usage key of the plurality of cognitive usage keys is generated for each end user and each software component. Usage insights are generated using the plurality of cognitive usage keys, where each of the usage insights describes a software component and indicates whether the software component increases productivity of one or more end users. Licenses available for each software component described in the usage insights are determined. Based on the usage insights and the licenses available for the software components, the software components and the licenses for the software components are redistributed.

20 Claims, 9 Drawing Sheets

(51) Int. Cl.
*G06F 11/30* (2006.01)
*G10L 25/63* (2013.01)
*H04L 43/065* (2022.01)
*H04L 67/00* (2022.01)
*H04L 67/306* (2022.01)
*H04L 67/55* (2022.01)
*G06F 21/10* (2013.01)
*H04N 21/254* (2011.01)
*G06V 40/16* (2022.01)

(52) U.S. Cl.
CPC .............. *G06F 40/20* (2020.01); *G10L 25/63* (2013.01); *H04L 43/065* (2013.01); *H04L 67/26* (2013.01); *H04L 67/306* (2013.01); *H04L 67/34* (2013.01); *H04N 21/2541* (2013.01); *G06V 40/174* (2022.01)

(58) Field of Classification Search
CPC ..... H04L 43/065; H04L 67/34; H04L 67/306; H04L 67/26; H04L 67/06; H04L 41/5019; H04L 43/0876; G10L 25/63; G06K 9/00302
See application file for complete search history.

(56) References Cited

U.S. PATENT DOCUMENTS

| | | | | |
|---|---|---|---|---|
| 10,956,541 | B2* | 3/2021 | Gaber | G06F 11/3466 |
| 2008/0250323 | A1* | 10/2008 | Huff | G06F 9/453 |
| | | | | 715/733 |
| 2014/0201344 | A1* | 7/2014 | Copsey | H04L 67/1004 |
| | | | | 709/223 |
| 2014/0244762 | A1* | 8/2014 | Wyndowe | H04L 67/10 |
| | | | | 709/205 |
| 2016/0196511 | A1 | 7/2016 | Anisingaraju et al. | |
| 2017/0116552 | A1* | 4/2017 | Deodhar | G06Q 10/06316 |
| 2017/0308978 | A1 | 10/2017 | Didcock et al. | |
| 2018/0197127 | A1 | 7/2018 | Brunner et al. | |
| 2018/0203684 | A1* | 7/2018 | Shuvali | G06F 11/3438 |
| 2018/0321927 | A1* | 11/2018 | Borthakur | H04L 67/34 |
| 2019/0012167 | A1 | 1/2019 | Boss et al. | |
| 2019/0341026 | A1* | 11/2019 | Visser | G10L 15/1815 |
| 2021/0073008 | A1* | 3/2021 | Park | G06F 9/4451 |
| 2021/0191701 | A1* | 6/2021 | Korzunov | G06F 11/3438 |
| 2021/0208993 | A1* | 7/2021 | Moyal | H04L 67/34 |

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.

M. Sidana, "Types of Classifications Algorithms in Machine Learning", Feb. 28, 2017, [online][retireved 111219], pp. 4, https://medium.com/@Mandysidana/machine-learning-types-of-classification-9497bd4f2 . . . .

* cited by examiner

Cognitive Usage Key Metrics 140

| Software Component | Cognitive Usage Key |
|---|---|
| P1 | Key for P1 |
| P2 | Key for P2 |
| ... | ... |
| Pm | Key for Pm |

FIG. 2

Software Component Report 144

| Workstation | Software Component Distribution |
|---|---|
| Workstation 1 | S1, S2, S5 |
| Workstation 2 | S1, S5, S8 |
| ... | ... |
| Workstation n | S3, S4 |

COGNITIVE AND DEEP LEARNING-BASED SOFTWARE COMPONENT DISTRIBUTION

BACKGROUND

Embodiments of the invention relate to cognitive and deep learning-based software component distribution. Software components may be software applications, software tools, etc.

With the continued growth in competitive software components for collaboration, development, debugging, etc., it is a challenge for any organization to decide on what software components is to be used for productivity of their end users. Sometimes, with cumulative and mutual understanding among a group of people, a decision is made to choose one software component, which may be feasible to a few of the end users but not to other end users. Sometimes an organization may choose a strategy to have multiple competitive software components for an enterprise package and distributes the software components of the enterprise package to end users based on requests, registrations (i.e., when a software component is purchased for the first time or used for the first time, the component is registered), and availability of the licenses for software components.

SUMMARY

In accordance with certain embodiments, a computer-implemented method is provided for cognitive and deep learning-based component distribution. The computer-implemented method comprises operations. In response to receiving cognitive data from a plurality of workstations, the cognitive data is stored as global cognitive data. A plurality of cognitive usage keys are generated using the global cognitive data, where each cognitive usage key of the plurality of cognitive usage keys is generated for each end user and each software component. Usage insights are generated using the plurality of cognitive usage keys, where each of the usage insights describes a software component and indicates whether the software component increases productivity of one or more end users. Licenses available for each software component described in the usage insights are determined. Based on the usage insights and the licenses available for the software components, the software components and the licenses for the software components are redistributed.

In accordance with other embodiments, a computer program product is provided for cognitive and deep learning-based component distribution. The computer program product comprises a computer readable storage medium having program code embodied therewith, the program code executable by at least one processor to perform operations. In response to receiving cognitive data from a plurality of workstations, the cognitive data is stored as global cognitive data. A plurality of cognitive usage keys are generated using the global cognitive data, where each cognitive usage key of the plurality of cognitive usage keys is generated for each end user and each software component. Usage insights are generated using the plurality of cognitive usage keys, where each of the usage insights describes a software component and indicates whether the software component increases productivity of one or more end users. Licenses available for each software component described in the usage insights are determined. Based on the usage insights and the licenses available for the software components, the software components and the licenses for the software components are redistributed.

In accordance with yet other embodiments, a computer system is provided for cognitive and deep learning-based component distribution. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. In response to receiving cognitive data from a plurality of workstations, the cognitive data is stored as global cognitive data. A plurality of cognitive usage keys are generated using the global cognitive data, where each cognitive usage key of the plurality of cognitive usage keys is generated for each end user and each software component. Usage insights are generated using the plurality of cognitive usage keys, where each of the usage insights describes a software component and indicates whether the software component increases productivity of one or more end users. Licenses available for each software component described in the usage insights are determined. Based on the usage insights and the licenses available for the software components, the software components and the licenses for the software components are redistributed.

BRIEF DESCRIPTION OF THE SEVERAL VIEWS OF THE DRAWINGS

Referring now to the drawings in which like reference numbers represent corresponding parts throughout:

FIG. 2 illustrates, in a block diagram, an example of cognitive usage key metrics for an end user in accordance with certain embodiments.

FIG. 3 illustrates, in a block diagram, an example of a software component report in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments use deep learning techniques to derive metrics of comfort level of end users (e.g., employees or other users) while using a software component and make decisions about what software components to distribute and which end users are to receive the software components to increase productivity. Embodiments manage real time updates, changes to software components, and changes to comfort and usage metrics.

Embodiments adapt as the number of enterprise level end-users changes and as the components change. For example, components may be developed and managed internally, may be developed and managed externally, may be third party components developed and managed by one vendor or may be third party components developed by a first vendor and managed by a second vendor. When there are enhancements to those components, embodiments are able to apply real time updates. For example, changes to software components (e.g., display related software components, navigation related software components) may be modified (e.g., for more comfortable and/or efficient use) in accordance with the metrics related to the previous and current experience of the end user. Thus, embodiments adapt to end users based on their usage and role (e.g., administrator end user, general end user, etc.), and the count of such instances are updated.

Embodiments provide a cognitive and deep learning-based software component license distribution in an enterprise and in a cloud infrastructure. An enterprise may be described as a business, a company or an organization. A software component may be described as a software component, application component or tool component. Cognitive and deep learning refers to monitoring an end user (e.g., an employee or other user of software components), who has opted to be monitored or given consent to be monitored while using one or more software components, to determine attributes of that user's interaction with the software (e.g., the end user was uncomfortable using the software, the end user found the software easy to use, the end user had a negative experience with the software, etc.).

Figure 1:
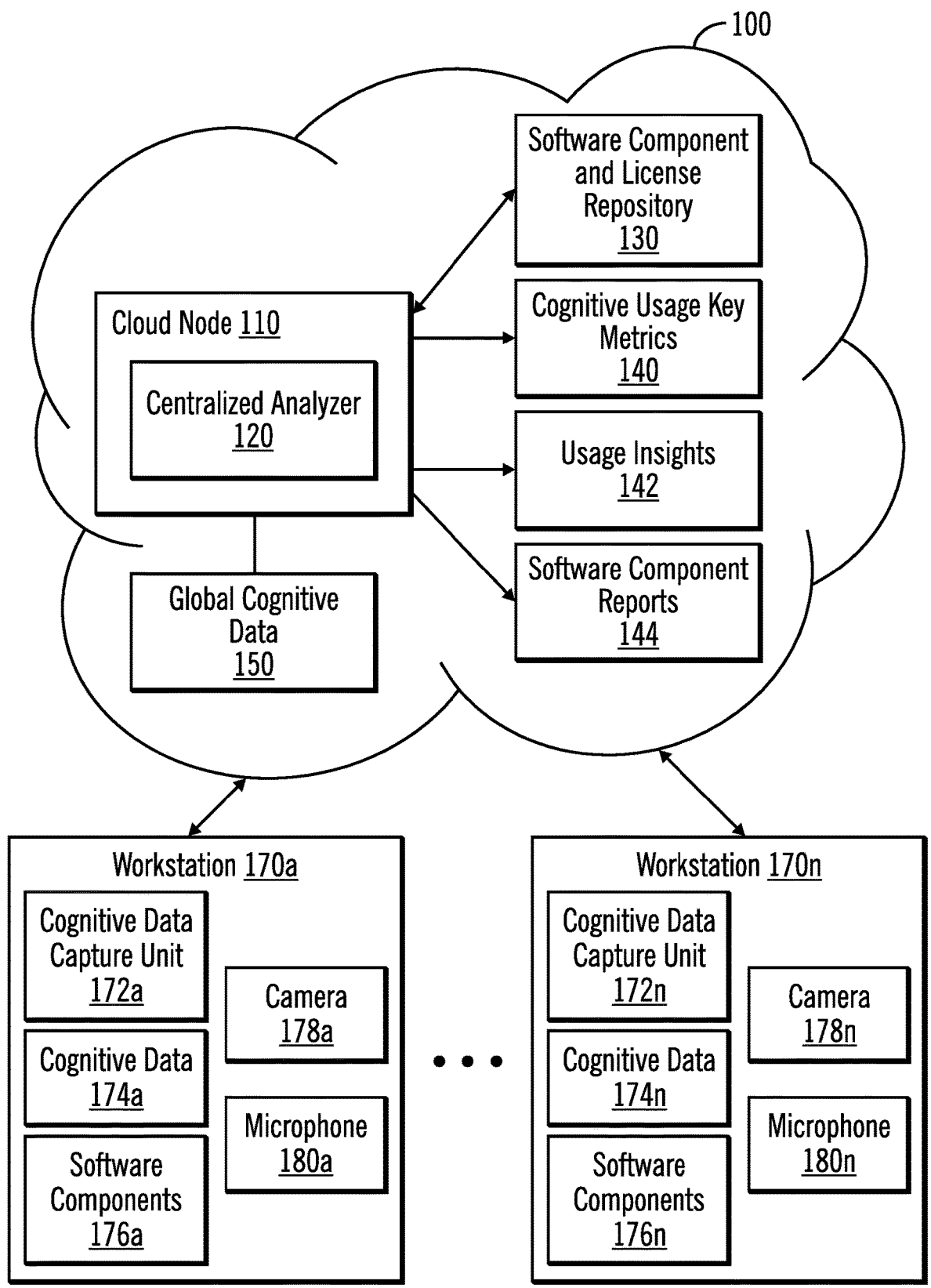
FIG. 1 illustrates, in a block diagram, a computing environment in accordance with certain embodiments.

FIG. 1 illustrates, in a block diagram, a computing environment in accordance with certain embodiments. A cloud node 110 is part of a cloud infrastructure 100. The cloud node 110 includes a centralized analyzer 120. The cloud node 110 is connected to workstations 170a . . . 170n. Each of the workstations 170a . . . 170n includes a cognitive data capture unit 172a . . . 172n. The cognitive data capture unit 172a . . . 172n captures cognitive data 174a . . . 174n about an end user using that workstation 170a . . . 170n who is using one or more software components 176a . . . 176n and sends that cognitive data 174a . . . 174n to the central analyzer 120. The cognitive data capture unit 172a . . . 172n also captures video from a camera 178a . . . 178n and audio from a microphone 180a . . . 180n, which are analyzed to add sentiment and tone to the cognitive data 174a . . . 174n. The central analyzer 120 stores the cognitive data 174a . . . 17n from different workstations 170a . . . 170n as global cognitive data 150 (i.e., historical data).

The centralized analyzer 120 also receives information about software components and licenses for those software components from a software component and license repository 130. The centralized analyzer 120 uses the cognitive data 174a . . . 174n, along with the information about software components and licenses to generate cognitive usage key metrics 140 (which represent metrics derived from the global cognitive data 150), to generate usage insights 142 (i.e., software component usage insights), and to generate a software component report 144.

Each of the workstations 170a . . . 170n may be any of a desktop computer, a mobile device (e.g., a smart phone), a virtual machine, etc.

FIG. 2 illustrates, in a block diagram, an example of cognitive usage key metrics 140 for an end user in accordance with certain embodiments. The cognitive usage key metrics 140 may be stored in a table with a software component column and a cognitive usage key column.

In certain embodiments, the cognitive usage key has eight indicators. The eight indicators represent eight cognitive and behavioral patterns of an end user, and these patterns are used in deciding the software distribution. In certain embodiments, there are an array of indicators. In certain embodiments, each of the indicators is one or more bits (e.g., is an 8-bit key). In certain embodiments, the cognitive usage key contains:

Indicator 1—specifies an end user level in a hierarchy, such as an enterprise hierarchy or end-user hierarchy (with a range of 0-9).

Indicator 2—specifies an end user position (with a range of 0-9); where the value may be mapped to a position, such as a technical position or a managerial position (e.g., an executive, a program manager, a director, an architect, a developer, technician, etc.); where the highest and lowest positions may be configured and interchangeable per organization (e.g., a developer or technical position may be higher for some components, while a managerial position may be higher for other software components).

Indicator 3—specifies a software component (with a range of 0-9), where the value is mapped to the software component.

Indicator 4—specifies a feature of the software component (with a range of 0-9) (e.g., for an email system, features are reading, composing, replicating, out of office messaging, etc.; for a document, features are new document, copy document, cut document, save document, etc.).

Indicator 5 specifies a behavioral level when using the software component, where the behavioral level describes a state that is derived from a physical state, a mental state, keyboard usage, etc. Examples of behavioral levels include: satisfied, like, dislike, comfortable, uncomfortable, etc.

Indicator 6—specifies a sentiment (e.g., happy, unhappy, confused, neutral, etc.), which may be derived based on NLP, facial analysis, and tone analysis.

Indicator 7—specifies a sentiment level (i.e., an emotional level), which may be derived using NLP, facial analysis, tone analysis using social data analysis (e.g., of chat, blogs, comments on feed, etc.), etc. For example, the sentiment level may be: eager to use the software component, likes to use the software component, prefers not to use the software component, will use the software component, etc.

Indicator 8—specifies a use of the software component (with a range of 0-9), where the use may indicate that the software component provides a client service, that the software component is to be used for component development, that the software component, etc. or may indicate that the software component is important to use or is optional, etc.

The cognitive usage key is generated based on real time analysis. The cognitive usage key may be described as providing a historical pattern of cognitive information of an end user with the global cognitive data.

In certain embodiments, the central analyzer 120 groups the cognitive usage keys based on a hierarchy of: software component->feature->end-user level. The cognitive usage key is used for analytics reporting about what features and software components are helping an end user to be productive, which end users are using which software components, which end users work well with which software components, etc.

In certain embodiments, the cognitive usage key has information about other software components in indicator 7 using social data that help to derive metrics. If that end user makes use of existing, available licenses, that may help other end users to be more productive.

FIG. 3 illustrates, in a block diagram, an example of a software component report 144 in accordance with certain embodiments. The software component report 144 may be stored as a table with a workstation (i.e., endpoint) column, and a software component column. As can be seen in the software component report 144, different software components are recommended for different workstations. In certain embodiments, the software component report 144 is used to redistribute software. In other embodiments, the software component report 144 is used to identify software components to be downloaded to a workstation of a new end user.

The cognitive data capture unit 172a . . . 172n may be described as a cognitive engine that uses Natural Language Processing (NLP) of text provided by an end user using a software component or other text entry application (e.g., a browser, an instant messaging application, a social media application, a document creation application, etc.) at the workstation 170a . . . 170n, facial analysis (e.g., using a facial recognition unit) to identify facial expressions of the end user in video (e.g., captured via a workstation's camera), and tone analysis (e.g., using a tone analyzer) to analyze audio from the end user in the video or other audio (e.g., captured from a workstation's microphone).

The cognitive data capture unit 172a . . . 172n uses the data from NLP, the facial analysis, and the tone analysis to identify end user sentiment (e.g., emotions) and to create usage insights. In certain embodiments, each of the usage insights describes a software component and indicates whether that software component increases productivity for one or more end users and/or does not increase productivity to one or more other end users. For example, a usage insight may indicate that software component 123 increases productivity for end users who are in group abc, but does not increase productivity for end users who are in group xyz. As another example, a usage insight may indicate that software component 101 does not increase productivity for the end users who are in group abc. As a further example, a usage insight may indicate that software component 7426 increases productivity for end users who are in group xyz. In certain embodiments, each of the usage insights describes one or more features of a software component and indicates whether the one or more features are productive to the end user.

In certain embodiments, any combination of NLP, facial analysis, and tone analysis may be used to generate usage insights. In certain embodiments, NLP, facial analysis or tone analysis may be used to generate usage insights. Thus, in various embodiments NLP, facial analysis or tone analysis may be used independently or in any combination to generate usage insights.

In certain embodiments, the centralized analyzer 120 uses a usage insight to create a suggestion for the license to be used (or acquired) for the end user, as well as what would be beneficial for the organization to improve end-user engagement into the software component and to improve engagement deliveries. Engagement deliveries may be described as a level of engagement in a software component, and the levels may include primary user, core users, full system user, all software component users, administrative users, etc.

The centralized analyzer 120 distributes software components based on attributes, including end user preferences based on sentiments that are determined using the NLP, facial analysis, and tone analysis for a multifarious (diverse) group.

The centralized analyzer 120 leverages individual end user usage reports from desktop to mobile devices. With embodiments, the centralized analyzer 120 leverages those usage data points on multiple attributes (e.g., reports of software components that are failing or crashing, continuous usage summary reports, etc.) to determine the ease of use of the applications having those software components and to provide suggestions to the enterprise administrators on new licenses to be acquired.

The centralized analyzer 120 also identifies the percentage of unlicensed software used in the enterprise and compares that with existing, alternate freeware software to provide suggestions of alternate freeware that may be used instead of the unlicensed software, while also removing the unlicensed software. The centralized analyzer 120 may also suggest acquiring licenses for the unlicensed software if comparable freeware is not found. The centralized analyzer 120 may obtain end user feedback as to what software is missing and then validate and acquire the software based on metrics. Moreover, the centralized analyzer 120 may suggest new software components or an alternate software component based on region, based on most used software component for a particular domain/subject matter, based on a last, successfully used set of software components by other project teams internally in the organization or outside the organization, etc.

In certain embodiments, the centralized analyzer 120 enhances productivity of an end user based on the software use on day-to-day basis. For example, an end user in an organization may devote time on a communication tool or a collaboration tool, and, if an end user's productivity is getting impacted with the use of the tool, that would harm overall productivity of the organization. The centralized analyzer 120 solves this by providing end users with the software that they need.

With embodiments, the centralized analyzer 120 makes use of cognitive and deep learning techniques, which will collect the user's visual and behavioral data and generate a cognitive usage key. Then, the centralized analyzer 120 uses the cognitive usage key to distribute software within the organization.

With embodiments, an enterprise may have multiple, competitive software components licensed and available for the end user. Then, the central analyzer 120 is able to provide an optimal distribution of those software components, resulting in overall better distribution management to increase end user productivity.

In certain embodiments, the central analyzer 120 provides a service hosted in the cloud node 110. In such embodiments, the central analyzer 120 provides a service to external clients and any size organization for distribution of software components to end users.

Figure 4:
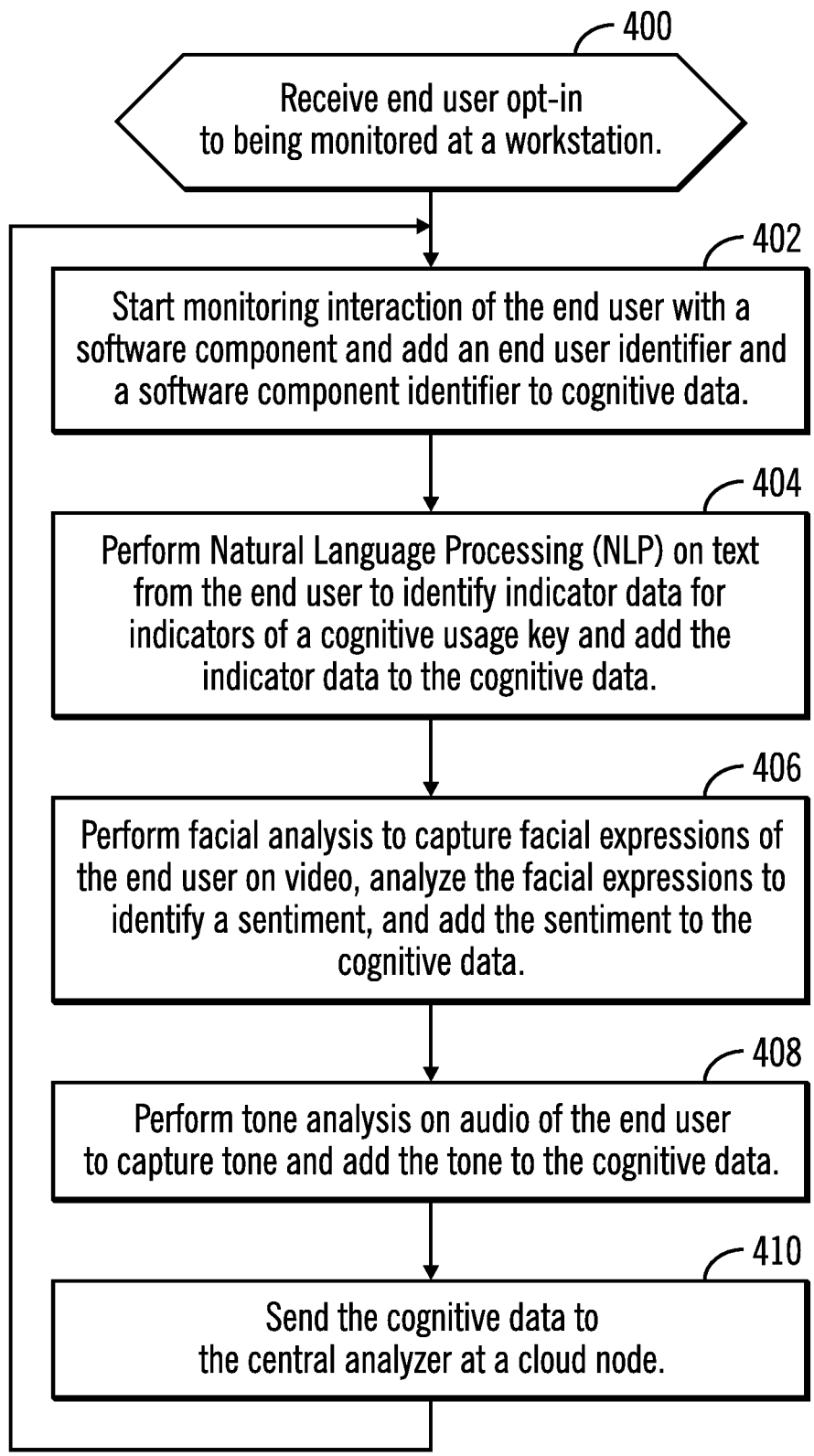
FIG. 4 illustrates, in a flowchart, operations for generating cognitive data in accordance with certain embodiments.

FIG. 4 illustrates, in a flowchart, operations for generating cognitive data 174a . . . 1704n in accordance with certain embodiments. Control begins at block 400 with the cognitive data capture unit 172a . . . 172n receiving end user opt-in to being monitored at a workstation. Thus, with embodiments, end users are not monitored without explicitly opting-in.

In block 402, the cognitive data capture unit 172a . . . 172n starts monitoring interaction of the end user with a software component and adds an end user identifier and a software component identifier to the cognitive data 174a . . . 174n.

In block 404, the cognitive data capture unit 172a . . . 172n performs Natural Language Processing (NLP) on text submitted from the end user to identify indicator data for indicators of the cognitive usage key and adds the indicator data to the cognitive data. For example, NLP may provide the data for an end user level in a hierarchy, an end user position, a software component, a feature of the software component, a behavioral level, a sentiment, a sentiment level, and a use of the software component.

In block 406, the cognitive data capture unit 172a . . . 172n performs facial analysis to capture facial expressions of the end user on video, analyzes the facial expressions to identify a sentiment, and adds the sentiment to the cognitive data. For example, the sentiment may be angry, confused, happy, sad, neutral, etc.

In block 408, the cognitive data capture unit 172a . . . 172n performs tone analysis on audio of the end user to capture tone and adds the tone to the cognitive data. For example, the tone may be an emotional tone (angry, cheerful, negative, etc.), a social tone (agreeable, conscientious, open, etc.), and a confidence tone (confident, tentative, nervous, etc.), etc.

In block 410, the cognitive data capture unit 172a . . . 172n sends the cognitive data to the central analyzer 120 at the cloud node 110.

Figure 5:
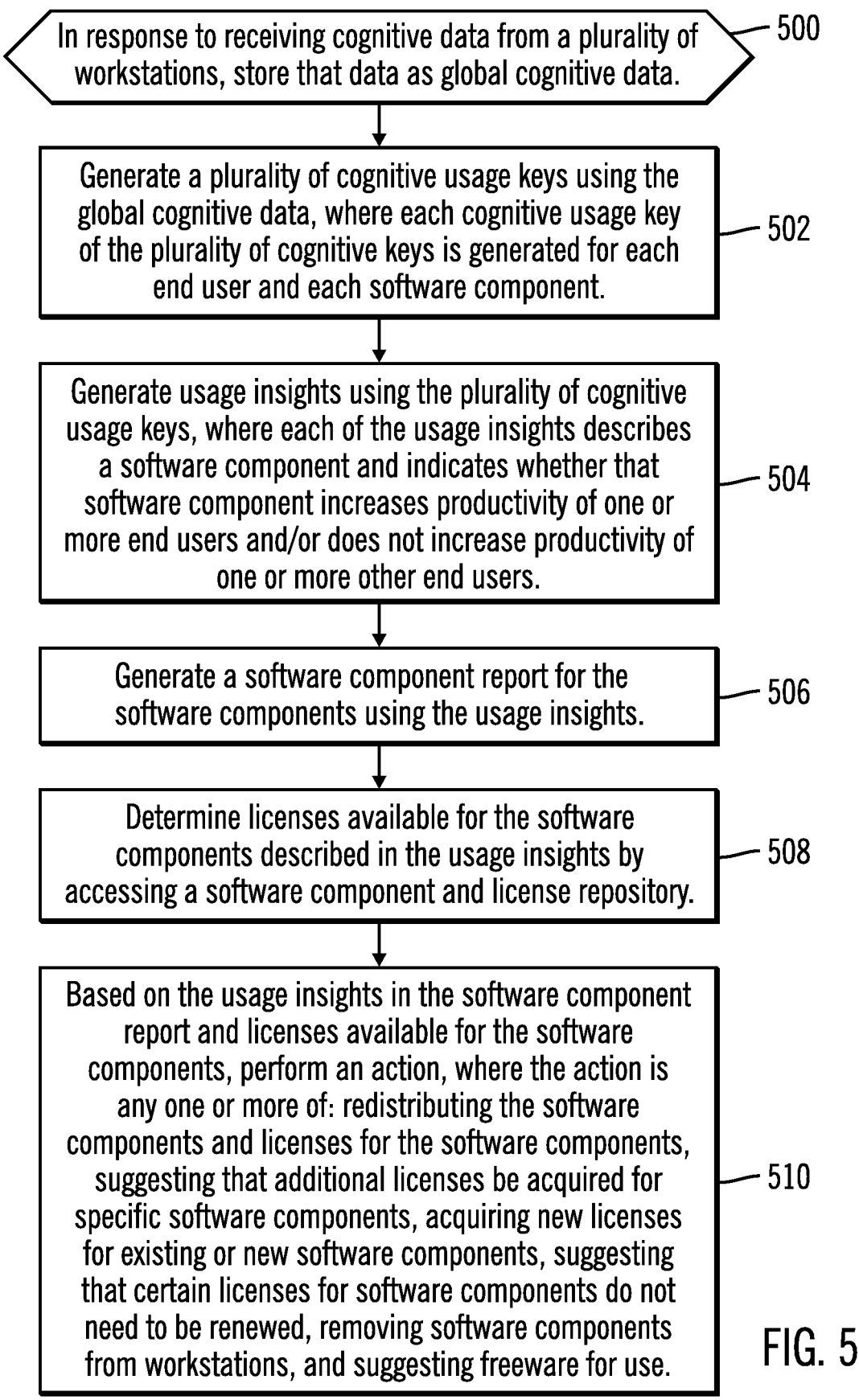
FIG. 5 illustrates, in a flowchart, operations for redistributing software components in accordance with certain embodiments.

FIG. 5 illustrates, in a flowchart, operations for redistributing software components in accordance with certain embodiments. Control begins at block 500 with the central analyzer 120, in response to receiving cognitive data from a plurality of workstations, storing that data as global cognitive data. In block 502, the central analyzer 120 generates a plurality of cognitive usage keys using the global cognitive data, where each cognitive usage key of the plurality of cognitive usage keys is generated for each end user and each software component.

In block 504, the central analyzer 120 generating usage insights using the plurality of cognitive usage keys, where each of the usage insights describes a software component and indicates whether that software component increases productivity of one or more end users and/or does not increase productivity of one or more other end users. For example, a usage insight may indicate that software component 123 increases productivity for end users who are in groups abc and def, while software component 101 does not increase productivity for the end users who are in group abc.

In block 506, the central analyzer 120 generating a software component report for software components using the usage insights to. In block 508, the central analyzer 120 determines licenses available for the software components described in the usage insights by accessing the software component and license repository 130.

In block 510, the central analyzer 120, based on the usage insights of the software component report and licenses available for the software components, performs an action, where the action is any one or more of: redistributing the software components and licenses for the software components, suggesting that additional licenses be acquired for specific software components, acquiring new licenses for existing or new software components, suggesting that certain licenses for software components do not need to be renewed, removing software components from workstations (e.g., to free up a license for installing the software components on other workstations or to remove unlicensed software components), and suggesting freeware for use.

With embodiments, redistributing software components also includes redistributing licenses for those software components.

Figure 6:
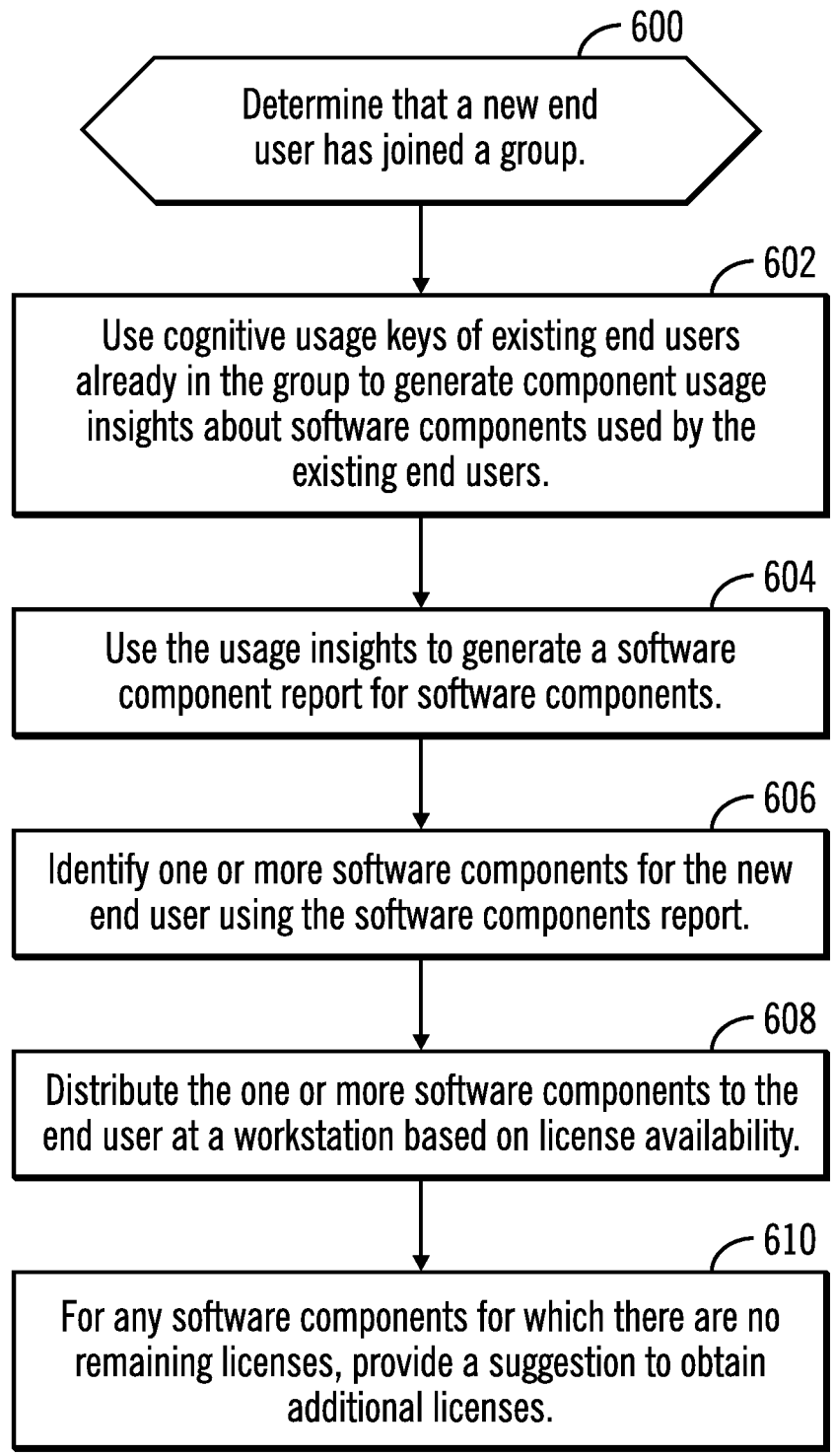
FIG. 6 illustrates, in a flowchart, operations for distributing software components to a new end user in accordance with certain embodiments.

FIG. 6 illustrates, in a flowchart, operations for distributing software components to a new end user in accordance with certain embodiments. Control begins at block 600 with the central analyzer 120 determining that a new end user has joined a group at the enterprise. In block 602, the central analyzer 120 uses cognitive usage keys of existing end users already in the group to generate usage insights about software components used by the existing end users. In block 604, the central analyzer 120 uses the usage insights to generate a software component report for software components.

In block 606, the central analyzer 120 identifies one or more software components for the new end user using the software components report. In block 608, the central analyzer 120 distributes the software components to the end user at a workstation based on license availability. In certain embodiments, the central analyzer 120 determines licenses available for the one or more software components by accessing the software component and license repository 130. In block 610, for any software components for which there are no remaining licenses, the central analyzer 120 provides a suggestion to obtain additional licenses, and this suggestion may be sent to an enterprise administrator.

Thus, the central analyzer 120 has the capability to perform cognitive and deep learning techniques, such as NLP, facial analysis, and tone analysis to determine sentiment (e.g., emotions) of end users while they are using different software components. The software components may be categorized as licensed software that is productively used, licensed software that is not productively used (and is an extra cost to the enterprise), and non-licensed software that is productively used. The central analyzer 120 is able to forecast cost to the enterprise (e.g., invest versus return) for software components (e.g., different operating systems) based on the performance of the software on different devices (e.g., desktops, mobile devices, virtual machines etc.). The central analyzer 120 generates a cognitive usage key for each end user.

The central analyzer 120 considers metrics for different categories of user personas using machine learning techniques to create the lead of licenses taken for the end user usage, as well as, what software components are beneficial for an enterprise to improve end user engagement, while considering engagement deliveries based on the end user's comfort.

The central analyzer 120 distributes software components based on end user emotions while working on different applications and creates a lead of licenses by considering metrics for different categories of the user personas. Distribution based on end user emotions may be described as generating recommendations of software components for a synthesis of actions performed by the end user while using the software components and emotions of the end user while using the software components. For example, end user 'A' on work station 'w1' has software component 's1' installed. While navigating within the software component 's1' to perform an action (e.g., a 'Filter' action for a page), the end user has to perform more operations to the 'Filter' action in the software component 's1' and associates a negative emotion with that activity. If the end use has to perform the 'Filter' action repeatedly as part of a job role, the end user may be dissatisfied with the software component 's1'. To overcome this, the central analyzer 120 considers the emotion+frequency of usage+activity context (e.g., navigation, filtering, etc.) and generates usage insights to administrators for better software component distribution.

In certain embodiments, considering this example, based on the number of all such experiences (e.g., good, positive, neutral, negative, etc.) within the entire organization for each user persona (e.g., developer, manager, etc.), the central analyzer 120 generates usage insights to the administrators on the number of new software or alternate software licenses needed and common licenses needed for all user personas (e.g., text editors, electronic email, etc.).

The central analyzer 120 generates usage insights for procurement and administrator teams on component license distribution and suggests new license procurement based on various attributes (e.g., reports of software components that are failing or crashing, continuous usage summary reports, etc.) that indicate the ease of use of those software components. Then, the central analyzer 120 provides suggestions to enterprise administrators on new licenses to be acquired.

The central analyzer 120 may generate a report and provide suggestions on cost to return on investment (ROI).

Although examples herein refer to software components, embodiments are applicable to distribution of hardware components or other components.

Figure 7:
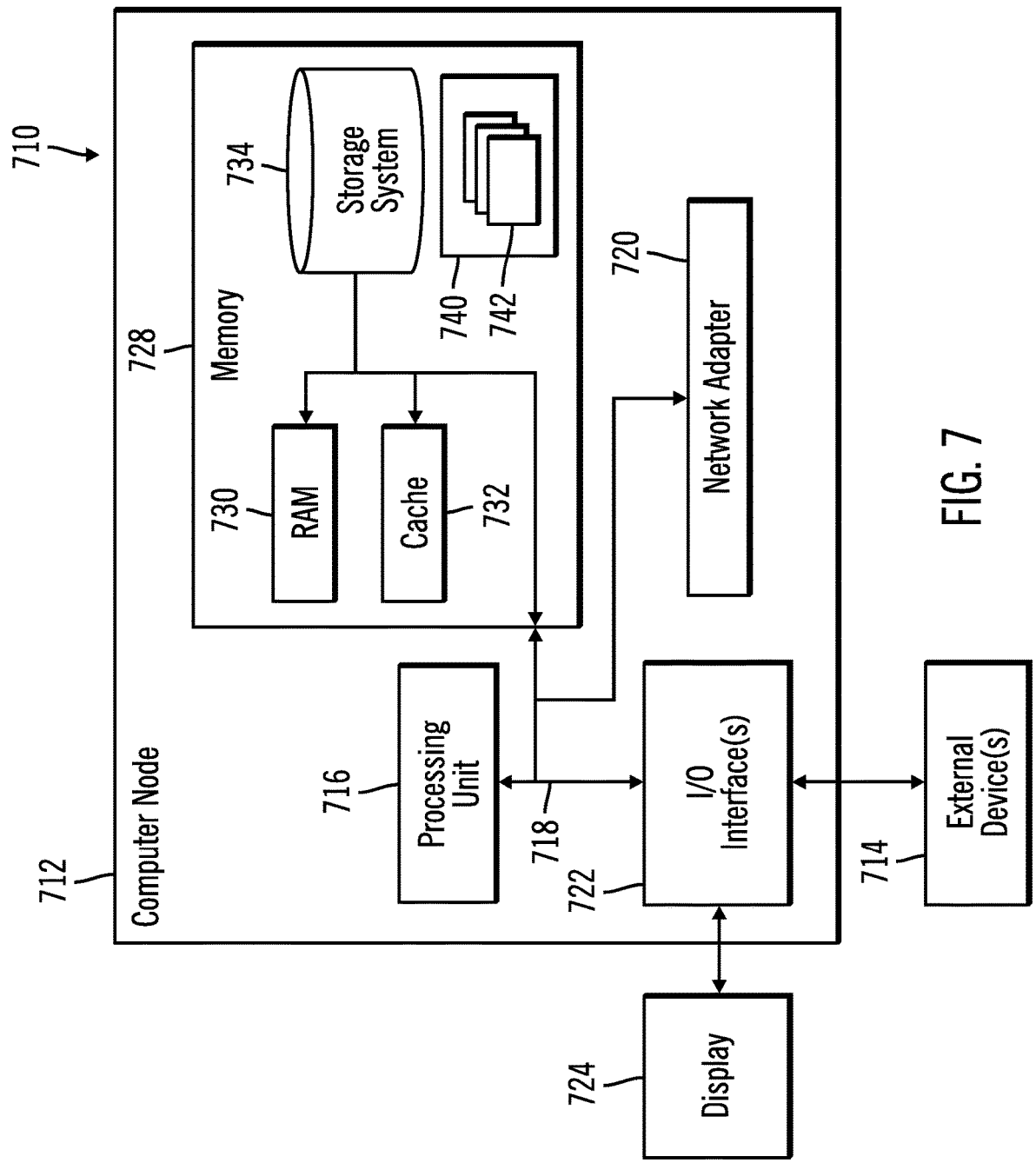
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In certain embodiments, the computer node 712 may be a remote device (e.g., a jump box, a connected device, a mobile network device, etc.).

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the cloud node 110 and each workstation 170a . . . 170n has the architecture of computer node 712.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
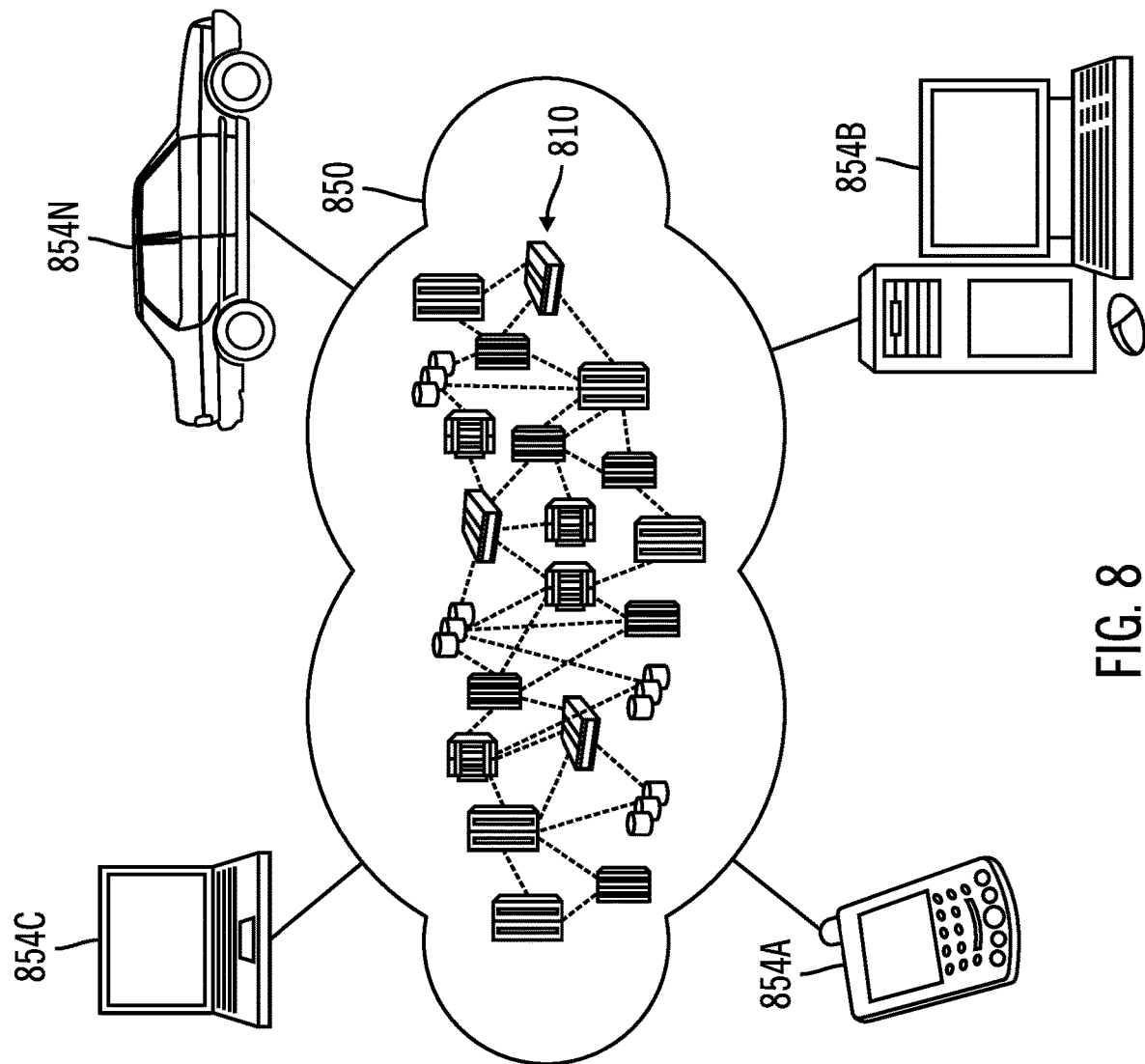
FIG. 8 illustrates a cloud computing environment in accordance with certain embodiments.

Referring now to FIG. 8, illustrative cloud computing environment 820 is depicted. As shown, cloud computing environment 820 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 820 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 820 can communicate with any type of computerized device over any type of network and/or network addressable connection (e.g., using a web browser).

Figure 9:
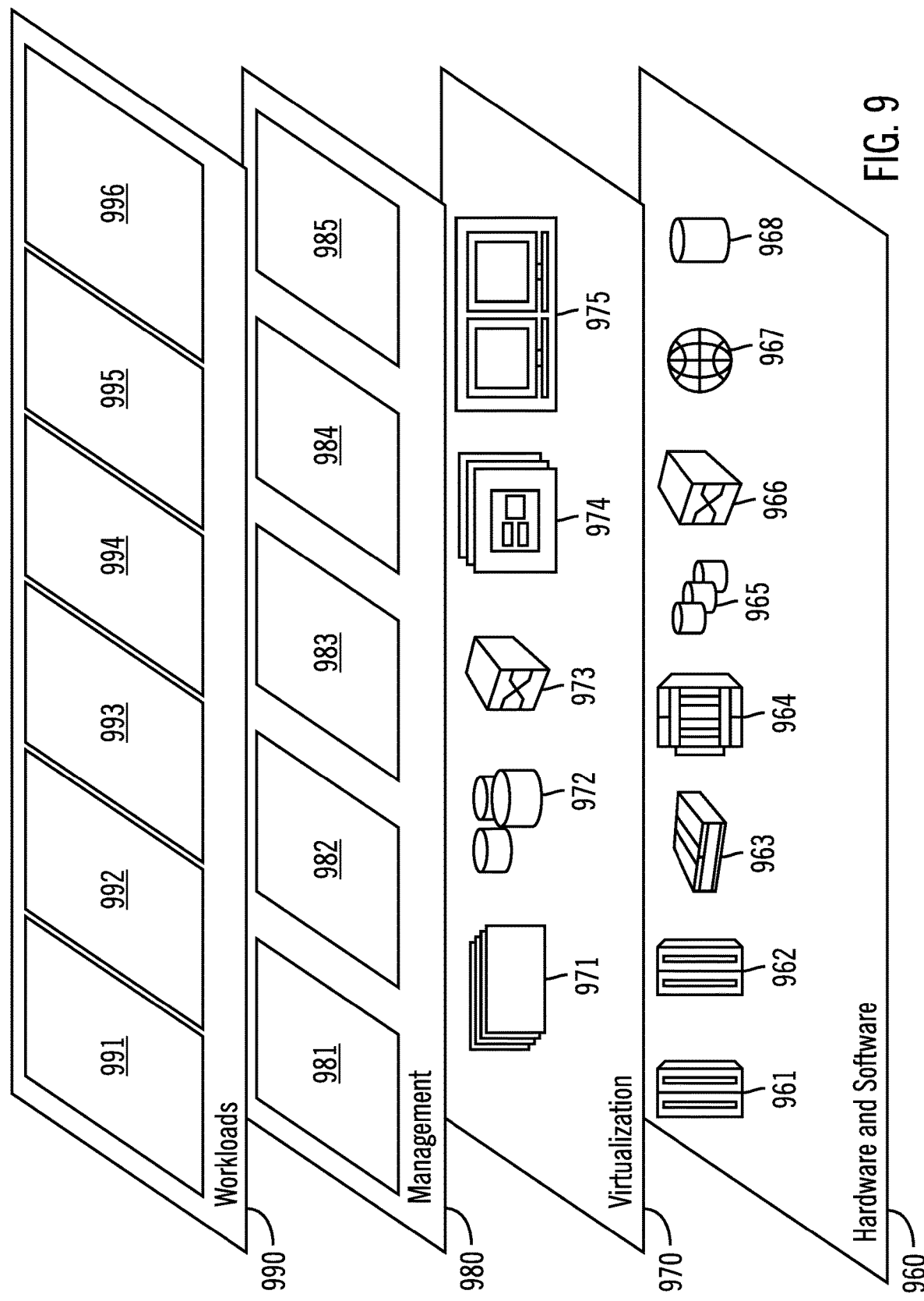
FIG. 9 illustrates abstraction model layers in accordance with certain embodiments.

Referring now to FIG. 9, a set of functional abstraction layers provided by cloud computing environment 820 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and cognitive and deep learning-based component distribution 996.

Thus, in certain embodiments, software or a program, implementing cognitive and deep learning-based component distribution in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   in response to receiving cognitive data from a plurality of workstations associated with a plurality of end users interacting with a plurality of software components, storing the cognitive data as global cognitive data, wherein the global cognitive data comprises indicator data from Natural Language Processing (NLP) of text of the plurality of end users, sentiments of the plurality of end users, and tones of the plurality of end users;
   generating a plurality of cognitive usage keys using the global cognitive data, wherein each cognitive usage key of the plurality of cognitive usage keys is generated for each combination of an end user of the plurality of end users and a software component of a plurality of software components used by that end user;
   generating usage insights using the plurality of cognitive usage keys, wherein each of the usage insights describes a particular software component of the plurality of software components and indicates whether the particular software component increases productivity of one or more end users of the plurality of end users;
   determining licenses available for each software component of the plurality of software components described in the usage insights; and
   based on the usage insights and the licenses available for the plurality of software components, redistributing the plurality of software components and the licenses for the plurality of software components.

2. The computer-implemented method of claim 1, wherein the operations comprise:
   performing an action, wherein the action is any one or more of: suggesting that additional licenses be acquired for specific software components, acquiring new licenses for any of existing software components of the plurality of software components and new software components, suggesting that certain licenses for the existing software components do not need to be renewed, removing any existing software components from one or more workstations of the plurality of workstations, and suggesting freeware for use.

3. The computer-implemented method of claim 1, wherein a cognitive usage key of the plurality of cognitive usage keys comprises a plurality of indicators for: an end user level in a hierarchy, an end user position, a specific software component, a feature of the specific software component, a behavioral level, a sentiment, a sentiment level, and a use of the specific software component.

4. The computer-implemented method of claim 1, wherein each workstation of the plurality of workstations performs operations comprising:
   starting monitoring of interaction of a specific end user of the plurality of end users with a specific software component of the plurality of software components;
   performing the NLP on text of the specific end user to identify indicator data for indicators of a cognitive usage key of the plurality of cognitive usage keys;
   performing facial analysis on video of the specific end user to identify a sentiment;
   performing tone analysis on audio of the specific end user to identify a tone; and
   adding the indicator data, the sentiment, and the tone to the cognitive data.

5. The computer-implemented method of claim 1, wherein the operations further comprise:
   determining that a new end user has joined a group;
   using cognitive usage keys of the plurality of cognitive usage keys of existing end users of the plurality of end users already in the group to generate new usage insights about one or more software components of the plurality of software components used by the existing end users; and
   distributing the one or more software components to the new end user based on available licenses.

6. The computer-implemented method of claim 1, wherein the operations further comprise:
   generating a software component report using the usage insights, wherein the software component report identifies one or more software components of the plurality of software components for each workstation of the plurality of workstations.

7. The computer-implemented method of claim 1, wherein a Software as a Service (SaaS) is configured to perform the operations of the method.

8. A computer program product, the computer program product comprising a computer readable storage medium having program code embodied therewith, the program code executable by at least one processor to perform operations for:
   in response to receiving cognitive data from a plurality of workstations associated with a plurality of end users interacting with a plurality of software components, storing the cognitive data as global cognitive data, wherein the global cognitive data comprises indicator data from Natural Language Processing (NLP) of text of the plurality of end users, sentiments of the plurality of end users, and tones of the plurality of end users;
   generating a plurality of cognitive usage keys using the global cognitive data, wherein each cognitive usage key of the plurality of cognitive usage keys is generated for each combination of an end user of the plurality of end users and a software component of the plurality of software components used by that end user;
   generating usage insights using the plurality of cognitive usage keys, wherein each of the usage insights describes a particular software component of the plurality of software components and indicates whether the particular software component increases productivity of one or more end users;
   determining licenses available for each software component of the plurality of software components described in the usage insights; and
   based on the usage insights and the licenses available for the plurality of software components, redistributing the plurality of software components and the licenses for the plurality of software components.

9. The computer program product of claim 8, wherein the program code is executable by at least one processor to perform further operations for:
   performing an action, wherein the action is any one or more of: suggesting that additional licenses be acquired for specific software components, acquiring new licenses for any of existing software components of the plurality of software components and new software components, suggesting that certain licenses for the existing software components do not need to be renewed, removing any existing software components from one or more workstations of the plurality of workstations, and suggesting freeware for use.

10. The computer program product of claim 8, wherein a cognitive usage key of the plurality of cognitive usage keys comprises a plurality of indicators for: an end user level in a hierarchy, an end user position, a specific software component, a feature of the specific software component, a behavioral level, a sentiment, a sentiment level, and a use of the specific software component.

11. The computer program product of claim 8, wherein each workstation of the plurality of workstations performs operations comprising:
   starting monitoring of interaction of a specific end user of the plurality of end users with a specific software component of the plurality of software components;
   performing the NLP on text of the specific end user to identify indicator data for indicators of a cognitive usage key of the plurality of cognitive usage keys;
   performing facial analysis on video of the specific end user to identify a sentiment;
   performing tone analysis on audio of the specific end user to identify a tone; and
   adding the indicator data, the sentiment, and the tone to the cognitive data.

12. The computer program product of claim 8, wherein the program code is executable by at least one processor to perform further operations for:
   determining that a new end user has joined a group;
   using cognitive usage keys of the plurality of cognitive usage keys of existing end users of the plurality of end users already in the group to generate new usage insights about one or more software components of the plurality of software components used by the existing end users; and
   distributing the one or more software components to the new end user based on available licenses.

13. The computer program product of claim 8, wherein the program code is executable by at least one processor to perform further operations for:
   generating a software component report using the usage insights, wherein the software component report identifies one or more software components of the plurality of software components for each workstation of the plurality of workstations.

14. The computer program product of claim 8, wherein a Software as a Service (SaaS) is configured to perform the operations of the computer program product.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
in response to receiving cognitive data from a plurality of workstations associated with a plurality of end users interacting with a plurality of software components, storing the cognitive data as global cognitive data, wherein the global cognitive data comprises indicator data from Natural Language Processing (NLP) of text of the plurality of end users, sentiments of the plurality of end users, and tones of the plurality of end users;
generating a plurality of cognitive usage keys using the global cognitive data, wherein each cognitive usage key of the plurality of cognitive usage keys is generated for each combination of an end user of the plurality of end users and a software component of the plurality of software components used by that end user;
generating usage insights using the plurality of cognitive usage keys, wherein each of the usage insights describes a particular software component of the plurality of software components and indicates whether the particular software component increases productivity of one or more end users of the plurality of end users;
determining licenses available for each software component of the plurality of software components described in the usage insights; and
based on the usage insights and the licenses available for the plurality of software components, redistributing the plurality of software components and the licenses for the plurality of software components.

16. The computer system of claim 15, wherein the operations further comprise:
performing an action, wherein the action is any one or more of: suggesting that additional licenses be acquired for specific software components, acquiring new licenses for any of existing software components of the plurality of software components and new software components, suggesting that certain licenses for the existing software components do not need to be renewed, removing any existing software components from workstations, and suggesting freeware for use.

17. The computer system of claim 15, wherein a cognitive usage key of the plurality of cognitive usage keys comprises a plurality of indicators for: an end user level in a hierarchy, an end user position, a specific software component, a feature of the specific software component, a behavioral level, a sentiment, a sentiment level, and a use of the specific software component.

18. The computer system of claim 15, wherein each workstation of the plurality of workstations performs operations comprising:
starting monitoring of interaction of a specific end user of the plurality of end users with a specific software component of the plurality of software components;
performing the NLP on text of the specific end user to identify indicator data for indicators of a cognitive usage key of the plurality of cognitive usage keys;
performing facial analysis on video of the specific end user to identify a sentiment;
performing tone analysis on audio of the specific end user to identify a tone; and
adding the indicator data, the sentiment, and the tone to the cognitive data.

19. The computer system of claim 15, wherein the operations further comprise:
determining that a new end user has joined a group;
using cognitive usage keys of the plurality of cognitive usage keys of existing end users of the plurality of end users already in the group to generate new usage insights about one or more software components of the plurality of software components used by the existing end users; and
distributing the one or more software components to the new end user based on available licenses.

20. The computer system of claim 15, wherein a Software as a Service (SaaS) is configured to perform the operations of the computer system.

* * * * *